United States Patent Office 3,394,152
Patented July 23, 1968

3,394,152
dl-8-DEHYDROESTRONE AND PROCESS FOR
THE PREPARATION THEREOF
Luciano Re, South Orange, N.J., assignor to Merck & Co.,
Inc., Rahway, N.J., a corporation of New Jersey
No Drawing. Filed Aug. 18, 1965, Ser. No. 480,779
8 Claims. (Cl. 260—397.45)

ABSTRACT OF THE DISCLOSURE

The invention disclosed herein is concerned with the novel synthesis of dl-8-dehydroestrone and dl-8-dehydroestrone lower alkyl ethers and intermediate compounds useful in the synthesis of dl-8-dehydroestrone and dl-8-dehydroestrone lower alkyl ether. More particularly, this invention relates to a synthesis of dl-8-dehydroestrone and dl-8-dehydroestrone alkyl ethers starting with dl-19-nor-4,9,8(14)-androstatriene - 3,17 - dione, which is obtained by total synthesis from 6-methoxytetralone according to the procedure in the publication in J.A.C.S., vol. 85, p. 1707 (1963). In this synthesis, the dl-19-nor-4,9,8(14)-androstatriene-3,17-dione is acetylated and isomerized by reaction with p-toluenesulfonic acid and isopropenyl acetate to form dl-8(14)-dehydroestrone acetate, which is hydrolyzed to the corresponding 3-hydroxy derivative by treatment with an aqueous alcoholic solution of potassium bicarbonate; this 3-hydroxy derivative is then reacted with hydrogen in the presence of palladium catalyst thereby reducing the 8(14) double bond to form dl-8-isoestrone which is converted to the corresponding methyl ether by reaction with di-methyl sulfate; this methyl ether is then reacted with chloranil thus forming a 8(9) double bond and producing dl-dehydroestrone methyl ether. dl-8-dehydroestrone lower alkyl ethers may be reduced to dl-estrone lower alkyl ethers according to the procedure in the publication in J. Org. Chem., vol. 28, p. 1092 (1963). dl-estrone lower alkyl ethers may be converted to dl-estrone by known procedures. The novel synthesis of this invention may be schematically represented as follows:

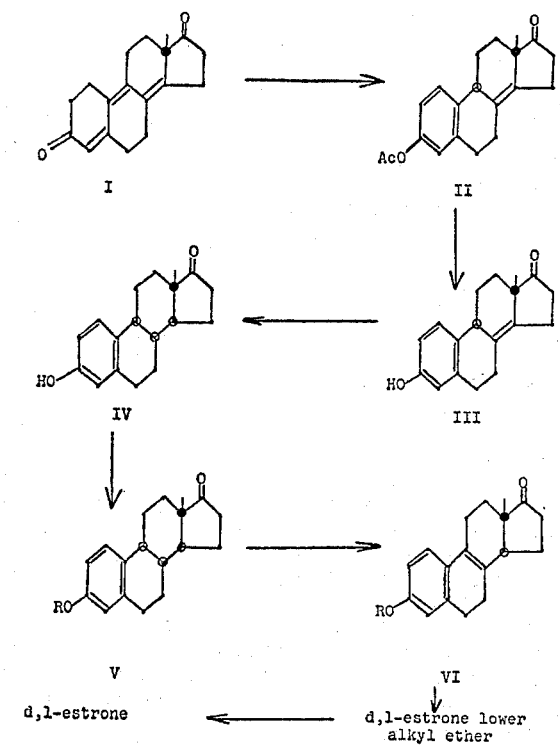

wherein R is an alkyl substituent, preferably having not more than five carbon atoms.

The first step in the novel synthesis of this invention is the acetylation and simultaneous isomerization of dl-19-nor-4,9,8(14)-androstatriene-3,17-dione (Compound I) by reaction of Compound I with anhydrous para-toluenesulfonic acid and isopropenyl acetate to provide dl-8(14)-dehydroestrone acetate (Compound II). The second step is the hydrolysis of Compound II to provide dl-8(14)-dehydroestrone (Compound III). The third step is the hydrogenation of the $\Delta^{8(14)}$-double bond of Compound III to provide dl-8-isoestrone (Compound IV). Compound IV is alkylated in a fourth step to provide dl-8-isoestrone lower alkyl ether (Compound V). The fifth step is the chloranil oxidation of Compound V to provide dl-8-dehydroestrone lower alkyl ether (Compound VI). The $\Delta^8$-double bond of Compound VI may be reduced with potassium in liquid ammonia to provide dl-estrone lower alkyl ether according to the method described in a publication in J. Org. Chem., vol. 28, p. 1092 (1963). dl-estrone lower alkyl ether may be readily converted to dl-estrone by known procedures, such as by treatment with pyridine hydrobromide at elevated temperatures.

In the conversion of Compound I to Compound II, Compound I is added to a freshly prepared solution of anhydrous para-toluenesulfonic acid in an aromatic solvent usch as benzene, toluene or xylene, and isopropenyl acetate is then added. The solution is refluxed in the dark under nitrogen for several hours. The reaction product may be conveniently isolated by adding anhydrous sodium acetate stirring the mixture for a few minutes at room temperature and removing the solvent by distillation under reduced pressure. The residue is dissolved in a solvent such as methylene chloride, washed with a cold dilute aqueous sodium bicarbonate solution until the methylene chloride solution is neutral. The methylene chloride solution is then washed with water, dried over magnesium sulfate and treated with charcoal. The charcoal is removed by filtration and the solvent is removed by distillation under reduced pressure. The residue crystallizes upon trituration with ether. The ether is removed by filtration. The crystalline product (Compound II) is further purified by recrystallization from a methylene chloride-hexane solvent mixture. The crystalline material thus obtained has a melting point of 132–137° C.

In the second step of the synthesis, the acetate group of Compound II is hydrolyzed to a hydroxy group by stirring under nitrogen at room temperature a solution of Compound II in methanol, which contains aqueous potassium carbonate solution. Compound III may be readily isolated from the reaction mixture by neutralization with dilute aqueous hydrochloric acid solution, removal of the methanol by distillation under reduced pressure, extraction with methylene chloride drying the extract with magnesium sulfate, filtering and removing the methylene chloride by distillation under reduced pressure. The residue is crystallized from a chloroform-hexane solvent and then recrystallized from an ethanol-hexane solvent mixture.

In the third step, a 95% ethanol solution of Compound III containing 10% palladium on charcoal is hydrogenated at room temperature and one atmosphere of hydrogen until an equimolar amount of hydrogen is absorbed. The catalyst is removed by filtration and the solvent is removed by distillation under reduced pressure. The residue is dl-8-isoestrone (Compound IV) and may be purified by recrystallization from methanol.

In the fourth step, the methyl ether of Compound IV is formed by refluxing an ethanol solution of Compound IV containing dimethyl sulfate and a strong inorganic base, such as potassium hydroxide or sodium hydroxide. The methyl ether may be conveniently isolated by pouring the reaction mixture into water, extracting the aqueous mixture with ether, washing the extract with dilute potassium hydroxide solution, then with water, drying the ether solution over magnesium sulfate and removing the ether by distillation under reduced pressure. The residue is dl-8-isoestrone methyl ether (Compound V).

In a fifth step, Compound V is oxidized by refluxing under nitrogen a solution of Compound V in solution in a lower aliphatic alcohol, preferably tertiary-butanol, containing chloranil. The reaction product may be conveniently isolated by filtering the reaction mixture, removing the aliphatic alcohol by distillation under reduced pressure and dissolving the residue in chloroform. The chloroform solution is allowed to stand overnight and then filtered to remove tetrachlorohydroquinone. The resulting solution is washed repeatedly with water, dried over sodium sulfate and the solvent is removed by distillation under reduced pressure. The residue is dissolved in methanol and treated with charcoal. The charcoal is removed by filtration and the reaction product, dl-8-dehydroestrone methyl ether (Compound VI) is crystallized from the methanol solution. Compound VI may be further purified by recrystallization from ethyl acetate.

The following examples illustrate methods of carrying out the present invention, but it is to be understood that these examples are given for purposes of illustration and not of limitation.

Example 1.—dl-8(14)-dehydroestrone acetate

A solution of anhydrous para-toluenesulfonic acid in benzene is prepared by removing 125 ml. of benzene by distillation at one atmospheric pressure from a solution of 0.63 g. of para-toluenesulfonic acid monohydrate in 250 ml. of benzene. 4.4 grams of dl-19-nor-4,9,8(14)-androstatriene-3,17-dione followed by 62.5 ml. of isopropenyl acetate are added to the benzene solution of anhydrous para-toluenesulfonic acid and the resulting solution is refluxed in the dark at atmospheric pressure and under nitrogen for five hours. 0.4 gram of anhydrous sodium acetate is added to the cooled benzene solution and the resulting mixture is stirred for 15 minutes at room temperature. The benzene is removed by distillation under reduced pressure at about 40° C. and the residue is dissolved in methylene chloride. The methylene chloride solution is washed until neutral with cold dilute aqueous sodium bicarbonate solution, and then with water. The resulting solution is dried over magnesium sulfate and charcoal is added to the dried solution. The charcoal is removed by filtration and the methylene chloride is removed by distillation under reduced pressure. The residual oil is triturated with ether until crystallization takes place and the ether is removed by filtration. The crystalline material is dl-8(14)-dehydroestrone acetate and is further purified by recrystallization from a methylene chloride-hexane solution mixture. The crystalline material has a melting point of 132–137° C.

Analysis.—Calc'd for $C_{20}H_{22}O_3$ (310.38): C, 77.39; H, 7.14. Found: C, 77.03; H, 7.27.

U.V. spectrum (ethanol): $\lambda_{max.}$ 275 ($\epsilon$1140), 272 ($\epsilon$1140), 267 ($\epsilon$1140).

Example 2.—dl-8(14)-dehydroestrone 0.7 gram of dl-8(14)-dehydroestrone acetate in solution in 42 ml. of methanol to which is added a solution of 0.6 g. of potassium carbonate in 8.4 ml. of water is stirred under nitrogen at room temperature for four hours. The reaction mixture is then neutralized with dilute aqueous hydrochloric acid solution and the methanol is removed by distillation under reduced pressure. The resulting aqueous mixture is extracted with methylene chloride and the methylene chloride solution is dried over magnesium sulfate and then filtered. The methylene chloride is removed by distillation under reduced pressure. The residual crystalline material is dl-8(14)-dehydroestrone and is purified by recrystallization from a chloroform-hexane solvent solution and then by recrystallization from an ethanol-hexane solvent mixture. The recrystallized material has a melting point of 218–220° C.

U.V. spectrum (methanol): $\lambda_{max.}$ 282 ($\epsilon$2330).

Example 3.—dl-8-isoestrone 0.134 gram of dl-8(14)-dehydroestrone in solution in 30 ml. of 95% ethanol containing 0.1 g. of 10% palladium on charcoal is hydrogenated at room temperature and atmospheric pressure until one molecular equivalent of hydrogen is absorbed. The catalyst is removed by filtration and the ethanol is removed by distillation under reduced pressure. The residue is dl-8-isoestrone and is purified by recrystallization from methanol. The recrystallized material has a melting point of 252–254° C.

U.V. spectrum (methanol): $\lambda_{max.}$ 281($\epsilon$2160).

Example 4.—dl-8-isoestrone methyl ether

Three milliliters of dimethylsulfate are added dropwise to a solution of 0.192 g. of dl-8-isoestrone in 30 ml. of ethanol containing 5 g. of potassium hydroxide and the mixture is refluxed for four hours under nitrogen. The solution is poured into 150 ml. of water and the aqueous solution is extracted with ether. The ether solution is washed with 5% aqueous potassium hydroxide solution then with water until neutral. The ether solution is dried over magnesium sulfate and the ether is removed by distillation under reduced pressure. The residue of dl-8-isoestrone methyl ether is recrystallized twice from methanol and has a M.P. 152.5–153.5° C.

Analysis.—Calcd. for $C_{13}H_{24}O_2$ (284.32): C, 80.24; H, 8.51. Found: C, 80.25; H, 8.64.

Example 5.—dl-8-dehydroestrone methyl ether

A solution of 0.12 g. of dl-8-isoestrone methyl ether in solution in 12 ml. of tertiary-butanol containing 0.12 g. of chloranil is refluxed for six hours under nitrogen. The reaction mixture is filtered and the tertiary-butanol is removed by distillation under reduced pressure. The residue is dissolved in chloroform and the chloroform solution is allowed to stand overnight and then filtered to remove the tetrachlorohydroquinone. The filtrate is washed repeatedly with water and the chloroform solution is dried over anhydrous sodium sulfate. The chloroform solution is concentrated to dryness by distillation under reduced pressure. The residue is dissolved in methanol and treated with charcoal. The charcoal is removed by filtration and the dl-8-dehydroestrone methyl ether is crystallized from the concentrated methanol solution and then from ethyl acetate. The recrystallized product has a M.P. of 121°–123° C.

U.V. spectrum (dioxane): $\lambda_{max.}$ 280 ($\epsilon$16,000).

Various changes and modifications may be made in carrying out the present invention without departing from the spirit and scope thereof. Insofar as these changes and modifications are within the purview of the annexed claims, they are to be considered as part of my invention.

What is claimed is:

1. The process for preparing dl-8-dehydroestrone lower alkyl ether which comprises the steps of reacting 19-nor-4,9,8(14)-androstatriene-3,17-dione with anhydrous para-toluenesulfonic acid and isopropenyl acetate to provide dl-8(14)-dehydroestrone acetate; reacting the latter compound with aqueous alcoholic potassium bicarbonate to provide dl - 8 - (14)-dehydroestrone; hydrogenating the $\Delta^{8(14)}$-double bond of the latter compound by reacting said compound with hydrogen in the presence of palladium catalyst to provide dl-8-isoestrone; reacting the latter compound with lower di-alkyl sulfate to provide dl-8-isoestrone lower alkyl ether; and reacting the latter compound with chloranil to provide dl-8-dehydroestrone lower alkyl ether.

2. The process for preparing dl-8-dehydroestrone lower alkyl ether whitch comprises the steps of reacting 19-nor-4,9,8(14)-androstatriene-3,17-dione with anhydrous para-toluenesulfonic acid and isopropenyl acetate to provide dl-8(14)-dehydroestrone acetate; reacting the latter compound with aqueous alcoholic potassium bicarbonate to provided d,l - 8(14) - dehydroestrone; hydrogenating the $\Delta^{8(14)}$-double bond of the latter compound by reacting said compound with hydrogen in the presence of palladium catalyst to provide dl-8-isoestrone; reacting the latter compound with di-methyl sulfate to provide dl-8-isoestrone methyl ether; and reacting the latter compound with chloranil.

3. The process for the preparation of dl-8(14)-dehydroestrone acetate which comprises reacting dl-19-nor-4,9,8(14)-androstatriene-3,17-dione with anhydrous para-toluenesulfonic acid and isopropenyl acetate.

4. The process for the preparation of dl-8-isoestrone which comprises hydrogenating the $\Delta^{8(14)}$-double bond of dl-8(14)-dehydroestrone by reacting said dl-8(14)-dehydroestrone with hydrogen in the presence of palladium catalyst.

5. The process of preparing dl-8-dehydroestrone lower alkyl ether which comprises oxidizing dl-8-isoestrone lower alkyl ether with chloranil.

6. The process of preparing dl-8-dehydroestrone methyl ether which comprises oxidizing dl-8-isoestrone methyl ether with chloranil.

7. dl-8(14)-dehydroestrone acetate.

8. dl-8(14)-dehydroestrone.

References Cited

UNITED STATES PATENTS 2,930,805  3/1960  Marshall _____ 260—397.4

ELBERT L. ROBERTS, *Primary Examiner.*